United States Patent
Lee et al.

(10) Patent No.: US 8,441,754 B2
(45) Date of Patent: May 14, 2013

(54) SERVO PATTERN TRANSFER

(75) Inventors: Hoo-san Lee, Osan-si (KR); Sok-hyun Kong, Seoul (KR); Sung-chul Lee, Osan-si (KR)

(73) Assignee: Seagate Technology LLC, Cupertino, CA (US)

( * ) Notice: Subject to any disclaimer, the term of this patent is extended or adjusted under 35 U.S.C. 154(b) by 415 days.

(21) Appl. No.: 12/485,150

(22) Filed: Jun. 16, 2009

(65) Prior Publication Data

US 2009/0316297 A1  Dec. 24, 2009

(30) Foreign Application Priority Data

Jun. 24, 2008  (KR) .................. 10-2008-0059770

(51) Int. Cl.
*G11B 5/596* (2006.01)

(52) U.S. Cl.
USPC ........................................... 360/77.05

(58) Field of Classification Search ............ 360/17, 360/16, 135, 31, 77.05
See application file for complete search history.

(56) References Cited

U.S. PATENT DOCUMENTS

| | | | | |
|---|---|---|---|---|
| 4,959,820 A * | 9/1990 | Horimai et al. | ............ | 369/13.15 |
| 6,735,026 B2 * | 5/2004 | Nishikawa et al. | ............ | 360/17 |
| 6,790,534 B2 * | 9/2004 | Nishikawa et al. | ........ | 428/848.5 |
| 6,791,774 B1 * | 9/2004 | Albrecht et al. | ................ | 360/17 |
| 7,151,641 B2 * | 12/2006 | Nishikawa et al. | ............. | 360/17 |
| 7,199,953 B2 * | 4/2007 | Nishikawa et al. | ............. | 360/17 |
| 7,218,465 B1 * | 5/2007 | Deeman et al. | ................. | 360/16 |
| 7,602,566 B2 * | 10/2009 | Kuroda et al. | .................. | 360/17 |
| 7,616,394 B2 * | 11/2009 | Amemiya | ........................ | 360/31 |
| 2003/0034862 A1 * | 2/2003 | Nishikawa et al. | ............ | 335/106 |
| 2006/0040140 A1 * | 2/2006 | Kaizu et al. | .................... | 428/829 |
| 2009/0128958 A1 * | 5/2009 | Nishida et al. | ................. | 360/135 |
| 2009/0268599 A1 * | 10/2009 | Murakami | ................ | 369/275.4 |

FOREIGN PATENT DOCUMENTS

| | | |
|---|---|---|
| JP | 2002-230712 | 8/2002 |
| JP | 2003-228829 | 8/2003 |
| KR | 20010085377 | 9/2001 |

* cited by examiner

*Primary Examiner* — Fred Tzeng
(74) *Attorney, Agent, or Firm* — HolzerIPLaw, PC

(57) ABSTRACT

A servo master having a pattern capable of being magnetically transferred as a servo pattern to a magnetic recording medium, wherein the servo master is formed of a material having a magnetic anisotropic constant perpendicular to a surface of the magnetic recording medium. The magnetic transfer method can include preparing a servo master patterned with a servo pattern to be formed on a magnetic recording medium, and arranging the servo master on the magnetic recording medium and applying an external magnetic field to the servo master in a first direction perpendicular to a recording surface of the magnetic recording medium, and in a second direction parallel to the recording surface of the magnetic recording medium.

20 Claims, 3 Drawing Sheets

SERVO PATTERN TRANSFER

CROSS-REFERENCE TO RELATED APPLICATIONS

This application claims the benefit of Korean Patent Application No. 10-2008-0059770, filed on Jun. 24, 2008 in the Korean Intellectual Property Office, the disclosure of which is incorporated herein in its entirety by reference.

BACKGROUND

1. Field of the Invention

The present general inventive concept relates generally to a servo master to transfer a servo pattern including servo information to a magnetic recording medium, and to a magnetic transferring method using the servo master.

2. Description of the Related Art

Hard disk drives (HDDs) using a magnetic recording medium have large capacities and high speed access capabilities, and thus are being considered as a memory device not only for use with computers but also for various other digital devices. Recently, as the amount of data to be processed has increased with the fast development in industry and information technology, high density HDDs are required and the recording density of a magnetic recording medium is continuously increasing.

In a magnetic recording medium, servo information, which is needed to locate a magnetic head at a desired position on the magnetic recording medium for HDD driving, needs to be recorded in advance. To this end, a disk-shaped magnetic recording medium is divided into a data area and a servo area, and servo information needed for track seeking and track following is recorded in the servo area as a servo pattern, which is a recording layer of the magnetic recording medium magnetized in a predetermined pattern.

Generally, servo information is recorded such that a magnetic head magnetizes a servo area of each track in a predetermined pattern after a head disk assembly. However, this is time consuming and expensive, and as the recording density of the magnetic recording medium is increased, the time taken to record servo information is further increased.

Alternatively, servo information has been recently recorded using a magnetic transfer method using a servo master in which the entire servo pattern is printed. In this case, a sufficiently large external magnetic field needs to be applied in the servo master, so as to generate a magnetic field capable of magnetizing a magnetic recording medium. To this end, the size of a device for generating an external magnetic field, such as an electromagnetic device, is increased in order to generate a large magnetic field. Accordingly, a servo master and a magnetic transfer method capable of generating a magnetic field for magnetizing a magnetic recording medium in a more efficient way are necessary.

SUMMARY

Embodiments of the present general inventive concept can provide a servo master in which a large magnetic field is generated using a relatively small external magnetic field, and can provide a magnetic transfer method using the servo master.

Additional embodiments of the present general inventive concept will be set forth in part in the description which follows and, in part, will be obvious from the description, or may be learned by practice of the general inventive concept.

According to example embodiments of the present general inventive concept, there is provided a servo master comprising a pattern capable of being magnetically transferred as a servo pattern to be formed on a magnetic recording medium, wherein the servo master can be formed of a material having a magnetic anisotropy in a perpendicular direction to a surface of the magnetic recording medium.

A magnetic anisotropy constant of the servo master may be $\frac{1}{20}$ of a perpendicular magnetic anisotropy constant of the magnetic recording medium or greater. The magnetic anisotropy constant of the servo master may be $1\times10^5$ erg/cc or greater.

The servo master may comprise at least one of CoCrPt, CoCrPtB, CoPt, CoFe, FePt, and CoFe.

According to another embodiment of the present general inventive concept, there is provided a method of magnetic transferring, the method including preparing a servo master patterned with a servo pattern to be formed on a magnetic recording medium, and arranging the servo master on the magnetic recording medium and applying an external magnetic field to the servo master in a first direction, which is perpendicular to a surface of a magnetic recording medium, and in a second direction, which is parallel to the surface of the magnetic recording medium.

In the method of magnetically transferring, the servo master according to the present general inventive concept may be used.

In the applying of the external magnetic field, the external magnetic field may be further applied in a third direction which is perpendicular to the first direction and the second direction.

According to another embodiment of the present general inventive concept, there is provided a method of forming a servo pattern on a magnetic recording medium, the method including disposing a servo master proximate a recording surface of the magnetic recording medium such that a predetermined magnetic pattern of the servo master faces a servo area of the recording surface in a perpendicular direction with respect to the recording surface, applying a first magnetic field (Hx) to the servo master in a first direction parallel to the perpendicular direction, and applying a second magnetic field (Hy) to the servo master in a second direction perpendicular to the first direction such that the first and second magnetic fields cooperate to form an effective magnetic field to transfer the magnetic pattern to the servo area.

The method may further include applying a third magnetic field (Hz) to the servo master in a third direction perpendicular to the first and second directions such that the first, second, and third magnetic fields cooperate to form the effective magnetic field.

An intensity of the effective magnetic field can be represented by the expression: $((Hx^2+Hy^2)^{1/3}+Hz^{2/3})^{3/2}$.

The predetermined magnetic pattern may include a first magnetic anisotropy constant in the perpendicular direction and the servo area may include a second magnetic anisotropy constant parallel to the perpendicular direction, the second magnetic anisotropy constant being substantially greater than the first magnetic anisotropy constant.

The predetermined magnetic pattern may include a plurality of tips protruding from the servo master in the perpendicular direction.

According to another embodiment of the present general inventive concept, there is provided a servo master to generate a servo pattern on a magnetic recording medium, the servo master including a predetermined magnetic pattern disposed proximate a servo area of the magnetic recording medium such that when an external magnetic field is applied to the servo master, perpendicular and lateral components of the external magnetic field cooperate to transfer the predetermined magnetic pattern as a servo pattern to the servo area of the magnetic recording medium.

BRIEF DESCRIPTION OF THE DRAWINGS

These and/or other embodiments of the present general inventive concept will become apparent and more readily appreciated from the following description of the example embodiments, taken in conjunction with the accompanying drawings of which.

DETAILED DESCRIPTION OF THE EMBODIMENTS

Figure 1:
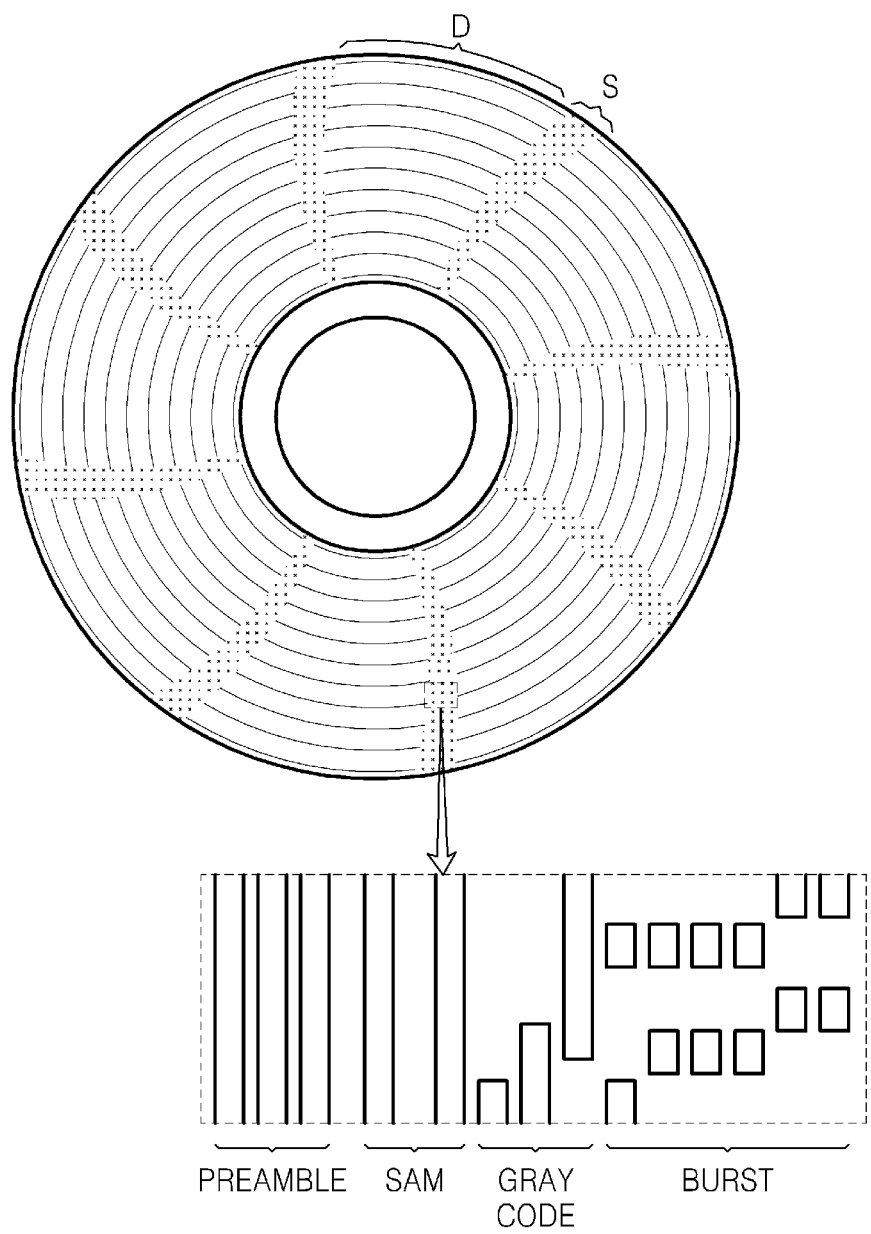
FIG. 1 illustrates a general structure of a magnetic recording medium.

Reference will now be made in detail to embodiments of the present general inventive concept, examples of which are illustrated in the accompanying drawings, wherein like reference numerals refer to the like elements throughout. The present general inventive concept may be embodied in many different forms and should not be construed as being limited to the embodiments set forth herein. Accordingly, the example embodiments are merely described below in order to explain the present general inventive concept by referring to the figures.

First, before describing a servo master and a magnetic transfer method using the servo master according to the present general inventive concept, a method of forming a servo pattern on a magnetic recording medium used in a hard disk drive will be described with reference to FIGS. 1 and 2.

FIG. 1 illustrates a general structure of a magnetic recording medium. A magnetic recording medium has a disk shape so that information can be recorded along a plurality of round tracks, and is divided into a data area D, to which data can be recorded, and a servo area S, to which servo information regarding the tracks can be recorded. In the servo area S, servo patterns including areas with predetermined magnetized patterns can be formed. A servo pattern may include, for example, a preamble providing servo synchronization, a servo address mark (SAM) indicating a start of a servo sector and providing synchronization to read a following gray code, a gray code providing a track ID, and burst providing information to calculate a position error signal to perform track following. The detailed shape of the illustrated patterns is exemplary, and the shape of the patterns may vary depending on the tracks. When the HDD is performing recording and/or reproducing operations with respect to the magnetic recording medium, the HDD can read the servo information from the servo patterns of the servo areas S to perform track seeking and track following.

Figure 2:
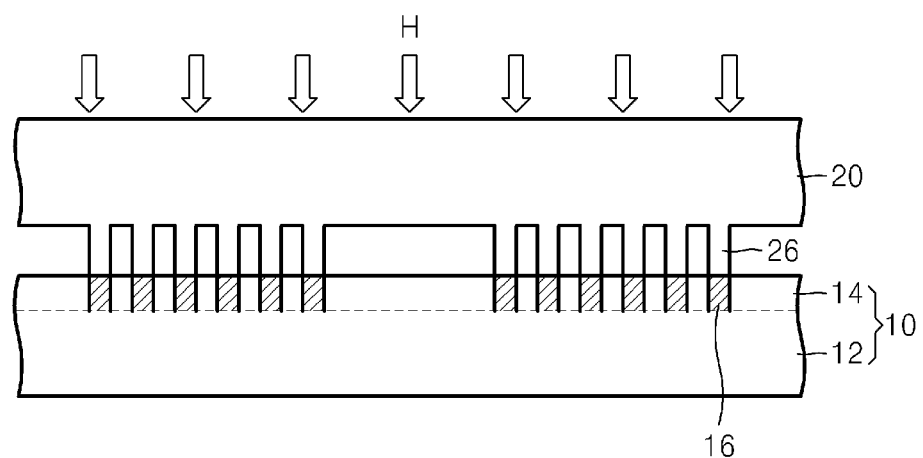
FIG. 2 illustrates a method of magnetically transferring a servo pattern to a magnetic recording medium.

FIG. 2 illustrates a method of forming the above-described servo pattern in a magnetic recording medium. In order to form a servo pattern in a magnetic recording medium 10, a servo master 20, which is capable of magnetically transferring a servo pattern to be formed, can be used. The servo master 20 may be generally formed of a soft magnetic material, and a predetermined pattern 26 is formed on a surface of the servo master 20. The pattern 26 may be patterned as a servo pattern to be formed on the magnetic recording medium 10. The magnetic recording medium 10 may include an underlayer 12 and a recording layer 14. The servo master 20 can be disposed on the magnetic recording medium 10 and an external magnetic field H can be applied to the servo master 20. As the external magnetic field H is applied, the servo master 20 and the recording layer 14 of the magnetic recording medium 10 are magnetized, and a magnetized pattern 16 having the same pattern as the pattern 26 formed on the servo master 20 can be transferred to the servo area S of the recording layer 14.

When magnetically transferring a servo pattern in the manner as described above, the servo master 20 can be configured to generate a magnetic field having a sufficiently large magnetic field to magnetize the recording layer 14 of the magnetic recording medium 10 in a perpendicular direction with respect to the recording layer 14. The servo master 20 can be formed of a soft magnetic material having a large saturation magnetization value, and since a large demagnetizing field is generated by shape anisotropy of the servo master 20 when perpendicularly magnetizing the servo master 20, it is very difficult for the servo master 20 which is formed of a magnetic material having little perpendicular magnetic anisotropy to be magnetized in a perpendicular direction.

Figure 3:
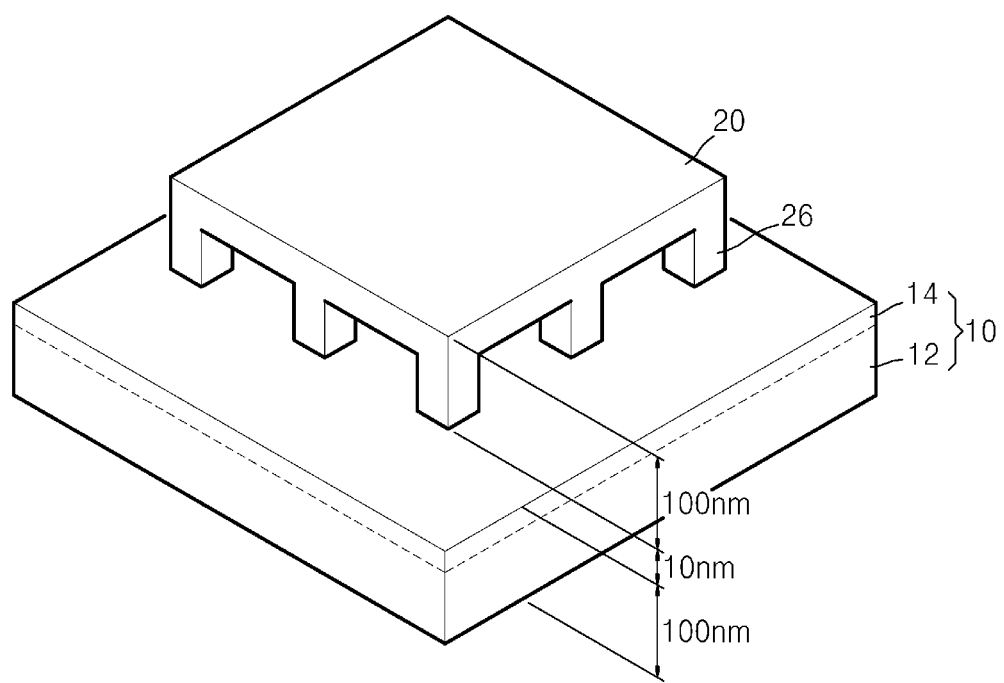
FIG. 3 illustrates measurements of a servo master and a magnetic recording medium used for computer simulation to deduce magnetic properties of a servo master according to an embodiment of the present general inventive concept.

FIG. 3 illustrates measurements of the servo master 20 and the magnetic recording medium 10 used for computer simulation to deduce magnetic properties of the servo master 20.

The magnetic recording medium 10 can include an underlayer 12 and a recording layer 14. Here, the recording layer 14 can be set to be formed of a material having a perpendicular magnetic anisotropy constant (Ku) of about $2.0 \times 10^6$ erg/cc and a saturation magnetization value (Ms) of about 300 emu/cc. The underlayer 12 can be set to be formed of a material having a perpendicular magnetic anisotropy constant (Ku) of about $1.0 \times 10^4$ erg/cc and a saturation magnetization value (Ms) of about 800 emu/cc.

The measurements of the servo master 20 were approximately 400 nm×400 nm×100 nm. As illustrated in FIGS. 2 and 3, the patterns 26 formed in the servo master 20 are configured as a pattern of protruded tips, with the size of each tip being about 80 nm×80 nm×40 nm.

A distance between the magnetic recording medium 10 and a protruded tip of the servo master 20 can be set to about 10 nm, in consideration of a thickness of a protection layer which is typically formed on the recording layer 14 to protect the recording layer 14 of the magnetic recording medium 10.

Figure 4:
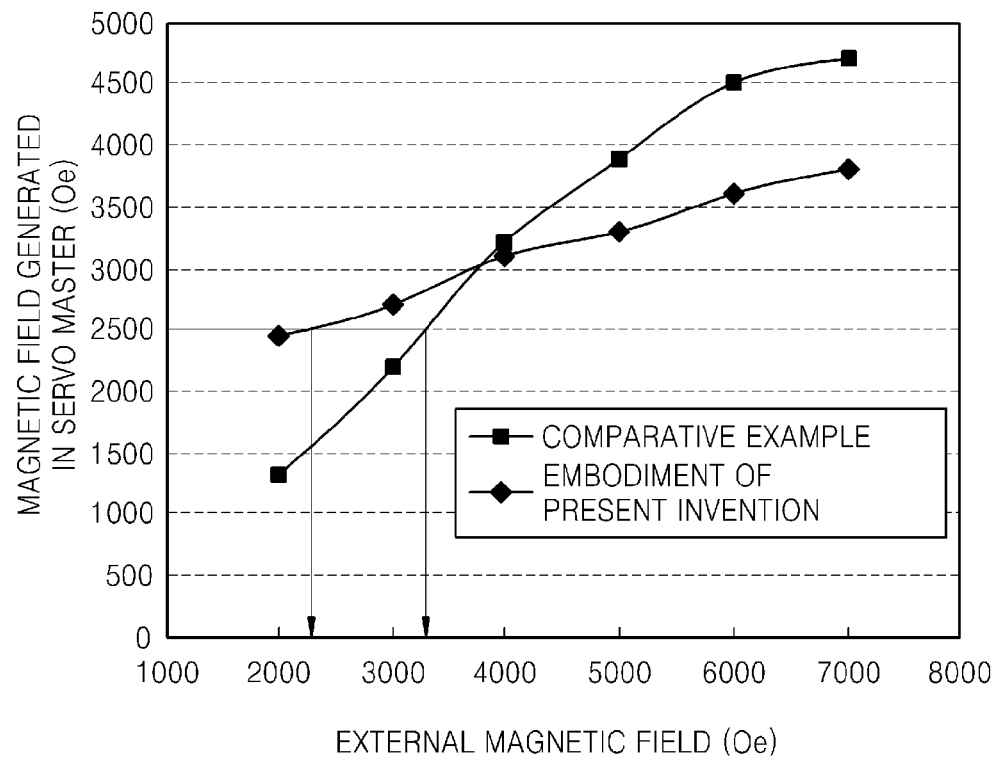
FIG. 4 is a graph illustrating a magnetic field generated according to an external magnetic field of servo masters according to an embodiment of the present general inventive concept and a comparative example.

FIG. 4 is a graph illustrating a magnetic field generated in servo masters according to an example embodiment of the present general inventive concept and a comparative example, by an external magnetic field.

The servo master according to the example embodiment was formed of a material having a generally perpendicular magnetic anisotropy constant (Ku) of about $1 \times 10^6$ erg/cc and a saturation magnetization value (Ms) of about 1000 emu/cc, and the servo master according to the comparison example was formed of a material having a perpendicular magnetic anisotropy constant (Ku) of about $1 \times 10^4$ erg/cc and a saturation magnetization value (Ms) of about 1600 emu/cc.

The horizontal axis of the graph of FIG. 4 denotes the intensity of an external magnetic field in a perpendicular direction, which was applied to magnetize the magnetic recording medium in a perpendicular direction, and the vertical axis of the graph denotes the intensity of a magnetic field generated in the servo master.

Referring to FIG. 4, the intensity of the external magnetic field applied to generate a magnetic field of 2500 Oe in the servo master in the case of the comparative example is about 3300 Oe, as indicated by the direction arrow pointing to the horizontal axis from the plot line of the comparative example. On the other hand, in the example embodiment illustrated in FIG. 4, the intensity of the external magnetic field applied to generate a magnetic field of 2500 Oe in the servo master is about 2300 Oe, as indicated by the direction arrow pointing to the horizontal axis from the plot line of the example embodiment of the present general inventive concept. Here, 2500 Oe is an approximate value of a magnetic field which is sufficient to magnetize a perpendicular magnetic recording medium in a perpendicular direction according to the properties of the example embodiment. It is recognized that the intensity of an external magnetic field to achieve this value was reduced by about 30% compared to the comparative example.

Although the graph of FIG. 4 compares only one example embodiment of the present general inventive concept with the comparative example, it can be recognized that by predicting the value of a magnetic field based on the graph variation between the comparison example having a magnetic anisotropy constant of $1 \times 10^4$ erg/cc and an exemplary embodiment having a magnetic anisotropy constant of $1 \times 10^6$ erg/cc, it can be determined that the size of an external magnetic field necessary to generate a 2500 Oe magnetic field in the servo master can be reduced by about 10% or more when a servo master is formed of a material having a magnetic anisotropy constant of about $1 \times 10^5$ erg/cc. It can also be predicted that if the intensity of the magnetic field sufficient to perpendicularly magnetize a magnetic recording medium can be set lower than about 2500 Oe, the reduction effect of the effective external magnetic field may be greater. Also, since these results can be achieved with respect to a material having a perpendicular magnetic anisotropy constant of about $2 \times 10^6$ erg/cc to form a recording layer of a magnetic recording medium, the magnetic anisotropy constant of a material to form a servo master may be a value having a similar order, and the servo master may be formed of a material having a magnetic anisotropy constant of at least about 1/20 of the magnetic anisotropy constant of the recording layer or greater.

Figure 5:
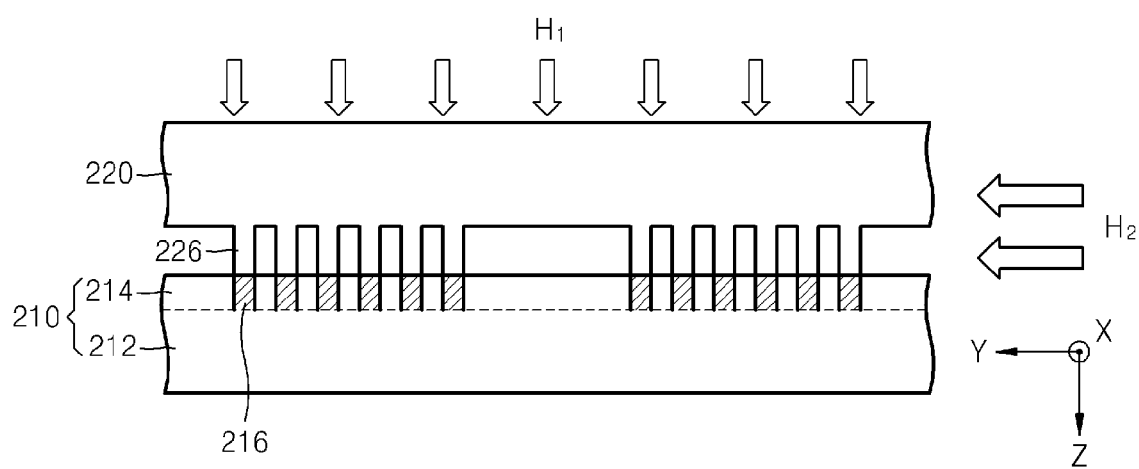
FIG. 5 illustrates a magnetic transfer method according to an embodiment of the present general inventive concept.

FIG. 5 illustrates a magnetic transfer method according to an embodiment of the present general inventive concept.

According to the magnetic transfer method illustrated in FIG. 5, a servo master 220 can be formed of a material having a perpendicular magnetic anisotropy and including a predetermined pattern 226 corresponding to the shape of a servo pattern 216 that is to be transferred to a magnetic recording medium 210. The pattern 226 may be formed using, for example, a nano-imprint process.

The magnetic recording medium 210 can be a perpendicular magnetic recording medium including a recording layer 214 having perpendicular magnetic anisotropy and an underlayer 212 including a soft magnetic material. Information can be recorded to the recording layer 214 by perpendicular magnetization, and the recording layer 214 can be formed of a magnetic thin film or a multi-layered magnetic thin film structure including, for example, at least one of Co, Fe, Pt, and Pd, which materials are known to have excellent perpendicular magnetic anisotropy. For example, the recording layer 214 may be formed of CoCrPtX. The underlayer 212 may be formed of a soft magnetic material including, for example, at least one of Co, Fe, and Ni.

A magnetic anisotropy constant of the servo master 220 may have a value of about 1/20 of the magnetic anisotropy constant of the recording layer 214 or greater, for example, about $1 \times 10^5$ erg/cc. The servo master 220 may be formed of a Co alloy or a Fe alloy; for example, the servo master 220 may be formed of a material including at least one of CoCrPt, CoCrPtB, CoPt, CoFe, FePt, and CoFe.

In order to perpendicularly magnetize the servo master 220 on a surface of the magnetic recording medium 210, and to thereby magnetize the recording layer 214 according to the pattern 226 formed in the servo master 220, the servo master 220 can be disposed on the magnetic recording medium 210 and an external magnetic field can be applied to the servo master 220. The external magnetic field applied to the servo master 220 can include an external magnetic field H1 in a first direction perpendicular to the surface of the magnetic recording medium 210 and an external magnetic field H2 in a second direction parallel to the surface of the magnetic recording medium 210. For example, in FIG. 5, H1 is illustrated as an external magnetic field in a Z direction, and H2 is illustrated as an external magnetic field in a Y direction.

Although a device to apply an external magnetic field is not illustrated in the figures, it is understood that an electromagnetic device may be used as a device to apply the external magnetic field(s) in accordance with the present general inventive concept. It is also understood that the external magnetic field H1 in the first direction perpendicular to the surface of the magnetic recording medium 210 may be applied to the servo master 220 by arranging an N-pole and an S-pole above and below the servo master 220, respectively. Also, the external magnetic field H2 in the second direction parallel to the surface of the magnetic recording medium 210 may be applied by arranging an S-pole and an N-pole at left and right sides of the servo master 220, respectively.

According to the magnetic transfer method of the present general inventive concept, an external magnetic field can be applied in a parallel direction with respect to the recording surface of the magnetic recording medium 210 as described above, taking the fact into consideration that not only can a perpendicular external magnetic field contribute to the perpendicular magnetization of a material having a perpendicular magnetic anisotropy, but also a horizontal external magnetic field can contribute to the perpendicular magnetization of a material having a perpendicular magnetic anisotropy. Accordingly, the external magnetic field contributing to perpendicular magnetization of a material may be referred to as an effective field (Hw_eff), wherein Hz represents an external magnetic field component in a perpendicular direction, and Hx and Hy represent external magnetic field components in a horizontal direction, and the intensity of the effective field Hw_eff may be represented by the expression: $((Hx^2+Hy^2)^{1/3}+Hz^{2/3})^{3/2}$.

Although not illustrated in FIG. 5, which illustrates the magnetic transfer method, an external magnetic field H3 in a third direction perpendicular to both the direction of H1 and the direction of H2, that is, an X direction, may further be applied to increase the effective field Hw_eff in order to more efficiently perpendicularly magnetize a magnetic recording medium. Here, the magnetic field H1 in the first direction perpendicular to the surface of the magnetic recording medium 210 can be illustrated in the +Z direction, but may also be illustrated in the −Z direction. Similarly, the second direction and the third direction parallel to the surface of the magnetic recording medium 210 may be set as two directions that are perpendicular to the direction of H1 and also perpendicular to each other.

In the graph of FIG. 4, the external magnetic field according to an example embodiment of the present general inventive concept represents an external magnetic field in a perpendicular direction to the surface of the magnetic recording medium. Furthermore, in the case of the comparison example of FIG. 4, an external magnetic field in a horizontal direction of the comparison example does not function as an effective field. However, according to embodiments of the present general inventive concept, since an external magnetic field parallel to the surface of the magnetic recording medium can function as an effective field, a magnetic transfer method can be performed in a more efficient manner. For example, when an electromagnetic device is used as an external magnetic field applying device, the size of an electromagnetic core or the current applied to a coil can be reduced. That is, when realizing an effective field of a predetermined intensity, in the case of applying a magnetic field to the surface of the magnetic recording medium by dividing magnetic field components in a perpendicular direction and in a horizontal direction, power consumption can be reduced compared to the case of realizing an effective field by applying a magnetic field only in a perpendicular direction with respect to the surface of the magnetic recording medium.

As described above, according to example embodiments of the present general inventive concept, the servo master can be formed of a magnetic material having a perpendicular magnetic anisotropy constant of an appropriate value in consideration of the properties of a magnetic recording medium. When performing a magnetic transfer method using the servo master, a servo pattern can be magnetically transferred to a magnetic recording medium in a more efficient manner by applying a relatively low intensity of external magnetic field, and the size of the device used to generate the external magnetic field or power consumption required therefor can be reduced, thereby reducing the costs.

Also, in the magnetic transfer method of the present general inventive concept, a servo master configured in accordance with embodiments of the present general inventive concept can be used. Here, an external magnetic field can be applied to the servo master in a perpendicular direction with respect to the surface of the magnetic recording medium in order to effectively perpendicularly magnetize the servo area of a magnetic recording medium, thus transferring a servo pattern to the magnetic recording medium in a more efficient manner.

While aspects of the present general inventive concept have been particularly illustrated and described with reference to exemplary embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments of the present general inventive concept have been illustrated and described, it would be appreciated by those of ordinary skill in the art that changes may be made in these embodiments without departing from the principles and spirit of the general inventive concept, the scope of which is defined in the appended claims and their equivalents.

What is claimed is:

1. A device comprising:
a servo master including a pattern capable of being magnetically transferred as a servo pattern to a magnetic recording medium, wherein the servo master is formed of a material having a magnetic anisotropy in a perpendicular direction to a recording surface of the magnetic recording medium; and
an apparatus configured to apply an external magnetic field to the servo master in a first direction perpendicular to a recording surface of the magnetic recording medium and in a second direction parallel to the recording surface of the magnetic recording medium.

2. The device of claim 1, wherein a magnetic anisotropy constant of the servo master is about 1/20 of a perpendicular magnetic anisotropy constant of the magnetic recording medium or greater.

3. The device of claim 1, wherein the magnetic anisotropy constant of the servo master is about $1\times10^5$ erg/cc or greater.

4. The device of claim 1, wherein the servo master comprising at least one of CoCrPt, CoCrPtB, CoPt, CoFe, FePt, and CoFe.

5. The device of claim 1, wherein the pattern comprises a plurality of tips protruding from the servo master in the perpendicular direction.

6. The device of claim 5, wherein a distance between ends of the protruding tips and the recording surface is about 10 nm when the pattern is being transferred to the magnetic recording medium.

7. The device of claim 1, wherein the pattern is formed using a nano-imprint process.

8. A method comprising:
preparing a servo master patterned with a servo pattern to be formed on a magnetic recording medium; and
arranging the servo master on the magnetic recording medium and applying an external magnetic field to the servo master in a first direction perpendicular to a recording surface of the magnetic recording medium, and in a second direction parallel to the recording surface of the magnetic recording medium.

9. The method of claim 8, wherein a magnetic anisotropy constant of the servo master is about 1/20 of a perpendicular magnetic anisotropy constant of the magnetic recording medium or greater.

10. The method of claim 8, wherein the magnetic anisotropy constant of the servo master is about $1\times10^5$ erg/cc or greater.

11. The method of claim 8, wherein the servo master is formed of at least one of CoCrPt, CoCrPtB, CoPt, CoFe, FePt, and CoFe.

12. The method of claim 8, wherein in the applying of the external magnetic field, the external magnetic field is further applied in a third direction perpendicular to the first direction and the second direction.

13. The method of claim 8, wherein applying the external field in the second direction further comprises arranging an S-pole on a first side of the servo master and an N-pole on a second side opposite the first side of the servo master.

14. The method of claim 8, wherein the applying the external field in the first direction further comprises arranging an N-pole on a side of the servo master away from the recording medium and an S-pole on another side of the servo master, the another side being opposite the side of the servo master away from the recording medium.

15. The method of claim 8, wherein preparing the servo master further comprises forming the servo pattern using a nano-imprint process.

16. A device comprising:
a servo master including a pattern capable of being magnetically transferred as a servo pattern to a magnetic recording medium; and an apparatus configured to apply an external magnetic field to the servo master in a first direction perpendicular to a recording surface of the magnetic recording medium and in a second direction parallel to the recording surface of the magnetic recording medium.

17. The device of claim 16, wherein the servo master is formed of a material having a magnetic anisotropy in a perpendicular direction to the recording surface of the magnetic recording medium.

18. The device of claim 16, wherein a magnetic anisotropy constant of the servo master is about $1/20$ of a perpendicular magnetic anisotropy constant of the magnetic recording medium or greater.

19. The device of claim 16, wherein apparatus is further configured to apply an external magnetic field to the servo master in a third direction perpendicular to the first direction and the second direction.

20. The device of claim 16, wherein the pattern is formed using a nano-imprint process.

* * * * *